United States Patent [19]

Thomas

[11] 4,187,743
[45] Feb. 12, 1980

[54] ROCK BIT AND METHOD OF MANUFACTURE

[75] Inventor: Robert D. Thomas, Tonkawa, Okla.

[73] Assignee: Smith International, Inc., Newport Beach, Calif.

[21] Appl. No.: 898,913

[22] Filed: Apr. 21, 1978

[51] Int. Cl.² .............................................. E21B 9/08
[52] U.S. Cl. .................................................. 76/108 A
[58] Field of Search ............. 76/108 A, 108 R, 101 R, 76/101 A, 101 E, DIG. 5; 175/366, 369, 412, 413, 375, 332; 308/3.2

[56] References Cited

U.S. PATENT DOCUMENTS

| 2,321,484 | 6/1943 | Harrington | 175/375 |
|---|---|---|---|
| 2,329,751 | 9/1943 | Fermier | 308/8.2 |
| 2,654,577 | 10/1953 | Green | 308/8.2 |
| 2,690,935 | 10/1954 | Alexander | 308/8.2 |
| 3,850,256 | 11/1974 | McQueen | 175/375 |
| 3,907,191 | 9/1975 | Lichte | 76/108 A |
| 3,987,859 | 10/1976 | Lichte | 175/375 |
| 4,043,411 | 8/1977 | Lichte | 175/369 |
| 4,045,646 | 8/1977 | Lichte | 76/108 A |
| 4,127,043 | 11/1978 | Evans | 76/108 A |

Primary Examiner—Othell M. Simpson
Assistant Examiner—Roscoe V. Parker, Jr.
Attorney, Agent, or Firm—Christie, Parker & Hale

[57] ABSTRACT

This technique for manufacturing a rotary rock bit involves forming a rock bit leg segment having an upper pin end and a lower shirttail end including a socket having a semi-cylindrical faying surface transverse to the axis of the rock bit being formed. A separately formed journal insert includes a journal pin for mounting a rock bit cutter cone and a shirttail portion transverse to the axis of the journal pin. The insert has a semi-cylindrical faying surface on the shirttail portion coaxial with the journal pin. The insert is fitted into the rock bit leg segment with the semi-cylindrical faying surface on the insert mated with the semi-cylindrical socket surface on the bit leg segment. The semi-cylindrical faying surfaces are then electron beam welded. A cutter cone is assembled on the journal pin and three such rock bit leg assemblies are welded together to form a rock bit which is completed with conventional machining operations.

10 Claims, 4 Drawing Figures

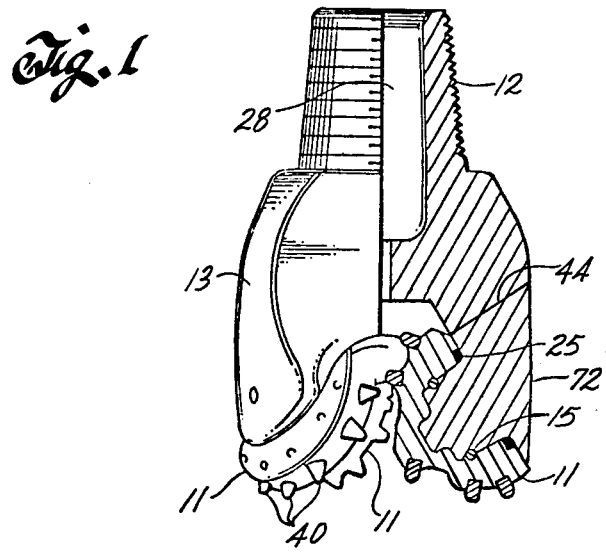
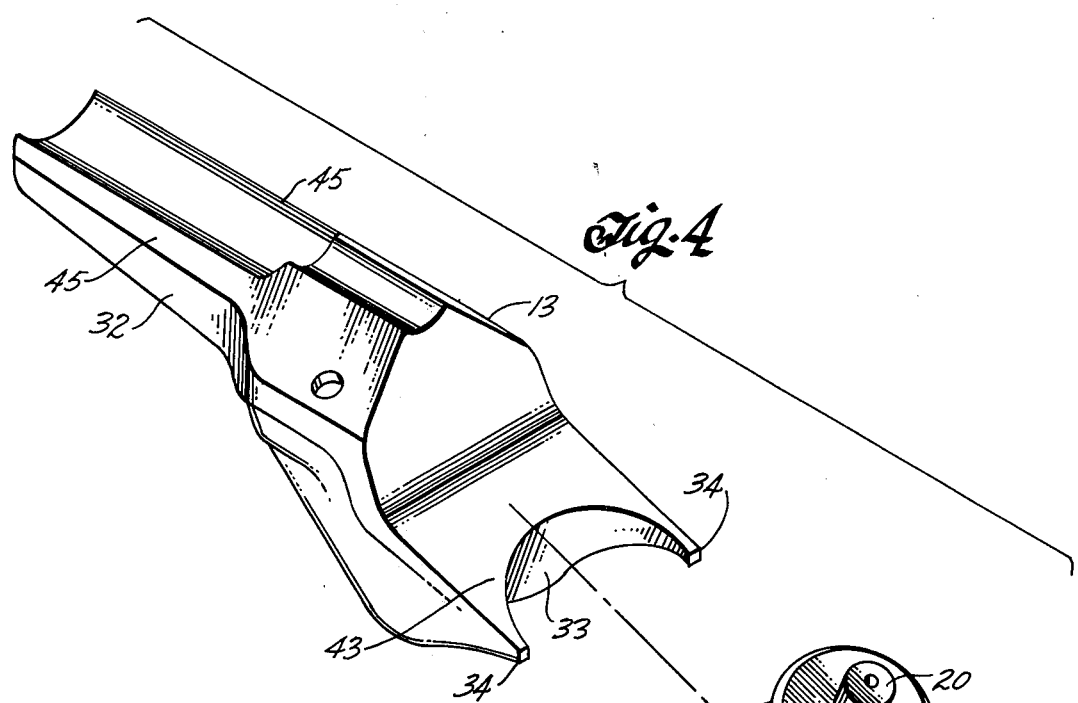
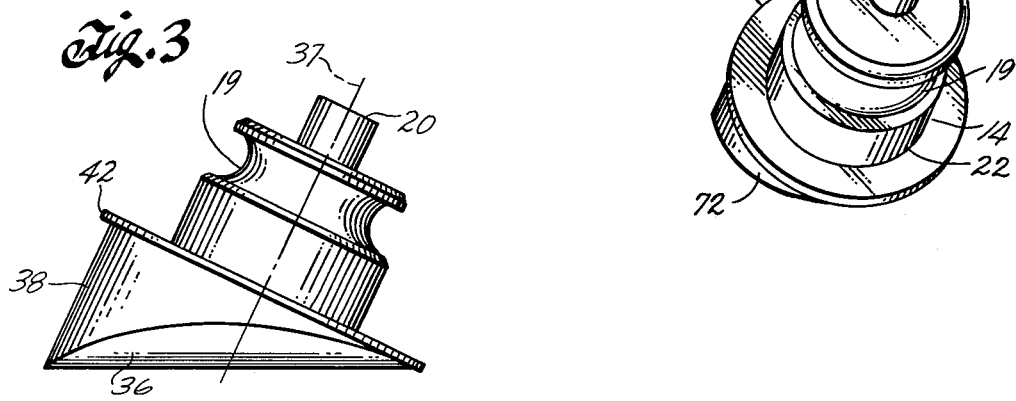

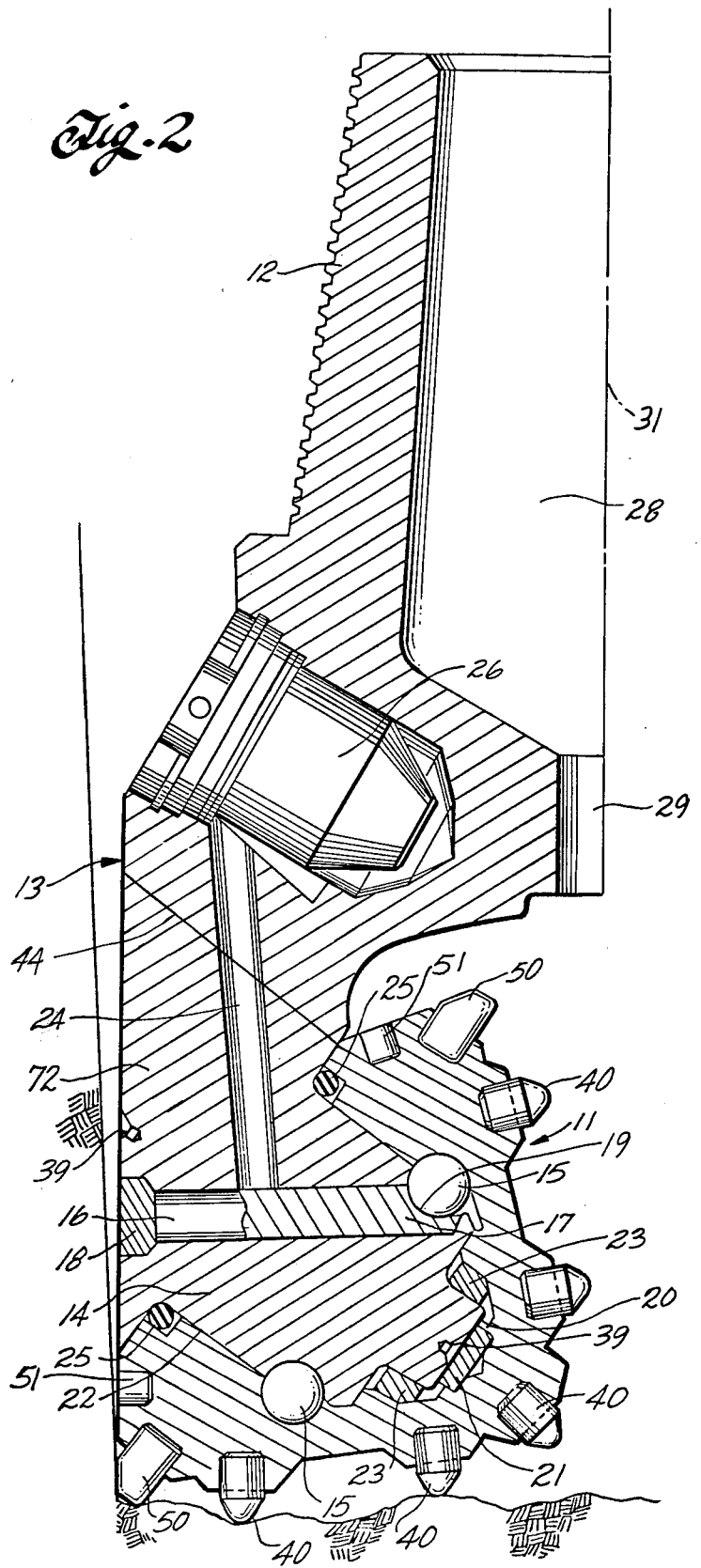

ROCK BIT AND METHOD OF MANUFACTURE

BACKGROUND

A rotary rock bit for drilling oil and gas wells, explosive shotholes, and the like is in the form of a steel rock bit body having a threaded upper pin end for connection at the lower end of a drill string. At the lower end of the rock bit in a typical embodiment three cutter cones are mounted for rotation about their respective axes as the rock bit rotates. Each of the cutter cones is mounted on a journal pin, the axis of which is transverse to the axis of rotation of the rock bit so that the cutter cone essentially rolls on the bottom of the hole being drilled. The cutter cones bear upon rock formation to be drilled as the rock bit is rotated, crushing and chipping the rock formation for drilling the well.

In forming a rotary rock bit of this type it is desirable that each element of the bit have the longest possible life commensurate with reasonable cost so that the maximum depth of hole can be drilled before it is necessary to retract a bit from the hole for replacement. Thus, in some rock bits to achieve a bearing life commensurate with the lifetime of the cutting structure on the cones, the journal pin on which such a cone is mounted is carburized to provide a high strength surface. It can be undesirable to carburize other portions of the rock bit, hence costly "stop-off" is applied to prevent carburization in selected areas. Excessive furnace capacity may be required for carburizing just the journal pin since a substantial part of the rock bit body is stopped off to prevent carburization but must still pass through the carburizing cycle. In some cases it is desirable to have the journal pin made of a different material from the balance of the rock bit body for enhanced mechanical properties. Further, the journal pin is turned to close tolerances to form bearing surfaces and it can be desirable to grind such bearing surfaces. This can be an expensive operation since an entire third of a bit must be mounted and turned. Large machinery and costly fixtures are needed to form the journal pin to the desired tolerances.

It is therefore desirable to have a technique for forming a rotary rock bit wherein such journal pins are manufactured separately from the balance of the rock bit body.

It has been suggested that such a journal pin be manufactured separately and attached to a rock bit by welding. Techniques for joining a journal pin and rock bit body are shown in U.S. Pat. Nos. 2,321,484; 2,329,751; 2,654,577; and 3,850,256. For example, U.S. Pat. No. 3,850,256 describes a technique where individual depending arms each having a bearing pin are electron beam welded to a rock bit body. U.S. Pat. No. 4,043,411 shows one method of having a separate journal pin secured to a leg of a rock bit by electron beam welding. In this patent an electron beam weld is made around the entire periphery of the journal pin on a rock bit leg segment. Electron beam welding in construction of rock bit bodies is disclosed in U.S. Pat. Nos. 3,907,191; 3,987,859; and 4,045,646.

Such arrangements for welding parts of a rock bit together can have substantial problems due to welding stresses or alignment and positioning of parts to the surprisingly close tolerances required in manufacture of rock bits. It is therefore desirable to provide a technique for welding a journal pin to a rock bit without introduction of high stress levels in the welded structure and without significant alignment or positioning problems.

BRIEF SUMMARY

There is, therefore, provided in practice of this invention according to a presently preferred embodiment, a method of making a rock bit by forming a rock bit leg segment having a socket with a semi-cylindrical faying surface and a separate journal insert including a journal pin and a male semi-cylindrical faying surface for fitting into the socket. The faying surfaces are electron beam welded around an arc of about 180° for connecting the journal pin to the balance of the rock bit body.

DRAWINGS

These and other features and advantages of the present invention will be appreciated as the same becomes better understood by reference to the following description of a presently preferred embodiment when considered in connection with the accompanying drawings wherein:

FIG. 1 illustrates in side view, partly in cross section a rock bit constructed according to principles of this invention;

FIG. 2 illustrates in fragmentary longitudinal cross section one leg of such a rock bit;

FIG. 3 is a side view of a journal pin insert; and

FIG. 4 is an exploded view of a journal pin insert and rock bit leg segment indicating the manner of assembly.

DESCRIPTION

A typical rock bit 10 of a type suitable for construction according to principles of this invention is shown in side view partially cut away in FIG. 1. The rock bit illustrated is a three cone, journal bearing bit but it is to be understood that other styles of bits of this general nature are suitable for assembly by the techniques described herein. For example, rock bits with anti-friction bearings or with different numbers of cones are suitable for construction in accordance with this invention and the particular style shown in FIG. 1 is simply by way of example.

The rock bit has a heavy duty steel body with a threaded pin joint 12 at its upper end. The main body of the rock bit is formed by welding together three steel legs 13 each terminating in a journal pin 14 on which a cutter cone 11 is mounted. FIG. 2 illustrates in longitudinal cross section through one such leg 13 showing the mounting of one of the three cutter cones 11. Such a conical cutter 11 may also be referred to herein as a cone or roller cutter. In use the rock bit rotates about its longitudinal axis 31 with the cones at the lower end and the upper end of the bit connected to a drill string by way of the threaded joint 12. As used herein upper and lower refer to locations with respect to the position of such a rock bit when drilling.

This invention concerns construction of such a rock bit leg by an electron beam welding technique which joins a shirttail portion 72 attached to the journal pin 14 to the balance of the steel body of the leg. Additional details of the leg construction technique are set out hereinafter following description of additional conventional aspects of the rock bit.

When the drill bit or rock bit is assembled after construction of a leg, ball bearings 15 are added through a ball passage 16 from the exterior of the leg to a ball bearing race 19 on the journal pin. The passage 16 is then closed with a ball retainer 17 which retains the balls in place. Typically the ball retainer 17 is welded in place with a ball plug 18. The ball bearings 15 may carry some radial or thrust load between the journal and the cone but a primary function of the balls is to lock the cone on the journal pin. A nose bearing 20 on the journal pin engages a thrust button 21 in the cone for carrying the principal thrust loads of the bearing structure. The brunt of the radial load between the cone and journal pin is carried by the main cylindrical bearing surfaces 22 and bushing 23. The solid journal bearings and ball bearings are lubricated by grease flowing through a lubricant passage 24. This grease is retained in the bearings by an O-ring or similar sealing element 25. The lubricant passage receives lubricant from a lubricant reservoir 26 containing a conventional pressure compensator.

A plurality of tungsten carbide inserts 40 are mounted in rows extending around the cone 11. An outermost row of carbide inserts 50 is generally referred to as the gage row since these are at the periphery of the hole being drilled and maintain its full gage diameter. As the cone rolls during rotation of the rock bit each of the tungsten carbide inserts 40 and 50 engages the bottom of the hole being drilled for crushing and/or chipping the rock formation. A row of heel inserts 51 is also provided on the heel of each of the cutters to provide abrasion resistance and help maintain gage of the rock bit.

Although described with tungsten carbide inserts in the cutter cone, it will be apparent that if desired a cone with milled steel teeth with abrasion resistant hard facing can also be used if desired. A variety of cutter cones are used for various drilling situations and any are suitable for use on a rock bit constructed according to this invention.

A central interior portion 28 of the upper end of the rock bit body is hollow and communicates with a hole 29 along the axis of rotation 31 of the rock bit. Alternatively the central interior portion 19 of the rock bit body communicates with other openings or jet orifices adjacent the cutter cones. Drilling mud is pumped from the surface through the drill pipe during operation to flow through such openings adjacent the cutters and carry rock particles back to the surface through the annulus around the bit and drill string pipe.

As mentioned briefly above, one-third of such a rock bit is made by electron beam welding a rock bit leg segment 13 and a shirttail portion 72 of a journal pin insert. In FIG. 4 such a bit leg segment and journal pin insert are shown in exploded position before assembly, and FIG. 3 illustrates such an insert in side view. These pieces are separately made and then electron beam welded together.

The bit leg segment is a steel forging having an upper shank end 32 which after assembly of three such legs to form a rock bit is threaded to form the pin joint 12. At the opposite or lower end of the rock bit leg segment there is a socket having a semi-cylindrical female faying surface 33, the axis of which extends transverse to the axis of rotation of the completed rock bit. The axis of the faying surface is at a large angle from the axis of the rock bit but not perpendicular so that the conical cutters mounted on the journal pin roll properly on the bottom of the hole during drilling. The socket extends approximately 180° around the axis of the cylindrical faying surface 33 and ends in narrow wings or tips 34.

The journal pin insert comprises the journal pin 14 and a shirttail portion 72. The shirttail portion includes an outer face 36 transverse to the axis 37 of the journal pin. The outer faces 36 is a fragment of an approximately cylindrical surface which eventually becomes the outer portion of the rock bit body near the gage of the hole being drilled. The journal pin insert also has a semi-cylindrical male faying surface 38 coaxial with the journal pin 14. The semi-cylindrical faying surfaces 33 and 38 extend about half-way around a right circular cylinder and are essentially a wedge-shaped segment of such a cylinder transverse to its axis. Centers 39 (FIG. 2) are formed on the outside face 36 of the insert and the nose 20 of the journal pin for receiving lathe centers used during machining of the various surfaces on the journal pin and the faying surface 38. Alternatively the nose of the journal pin or stock from which the journal pin is machined can be held in a collet or chuck for turning, thereby avoiding a center hole in the thrust bearing surface of the nose 20.

A narrow flange 42 remains at the inner edge of the faying surface 38 (as used herein "inner" refers to a direction towards the center of the rock bit body). A flat surface 43 is formed on the rock bit leg segment adjacent the faying surface 33 and perpendicular to the axis of the semi-cylindrical faying surface for receiving the flange 42 on the journal pin insert and acting as a positioning stop. In the accompanying drawings the flange is somewhat exaggerated in size for purposes of illustration. Such a flange can be about 0.04 inch thick and extend radially about 0.04 inch from the faying surface 38.

After the journal pin insert is machined substantially to its final geometry, the faying surface 38 is painted with a stop-off material to prevent carburizing and the bearing surfaces on the journal pin 14 are carburized. Much less furnace capacity is required for carburizing the journal pin inserts than if the entire bit leg needed to be taken through the carburizing cycle. After carburizing the stop-off material is removed, the faying surface 38 is final machined, if necessary, and the bearing surfaces on the journal pin are ground to the desired finished dimensions.

The journal pin insert is fitted into the socket on the bit leg segment with the semi-cylindrical faying surface 38 on the insert fitted to the semi-cylindrical faying surface 33 in the socket on the rock bit leg segment. The male semi-cylindrical faying surface 38 preferably has a slightly larger radius than the radius of the female semi-cylindrical faying surface 33. The insert can be about 0.001 inch larger, for example. Thus, when the journal pin insert is pressed into the socket, slight deformation of the tips 34 occurs and the insert is thereby temporarily held in place on the rock bit leg segment without additional tooling. The flange 42 acts as a stop against the flat surface 43 adjacent the socket for positioning the journal pin insert without tooling. The rotational position of the journal pin insert is not critical and can be set by hand without special gauges.

The faying surfaces 33 and 38 are then welded by electron beam welding with the electron beam directed into the weld joint from the inside or journal pin side of the bit leg; that is, the electron beam used for making the weld penetrates the flange 42 as well as penetrating the metal adjacent the faying surfaces. The flange provides a small amount of additional metal melted down at the face of the weld to prevent formation of a shallow trench along the weld. The electron beam power is adjusted for shallow penetration adjacent a tip 34 so as to weld the entire faying surfaces in this region without "blowing" through the weld bead. The electron beam power is progressively increased as the electron beam traverses to the center of the weld to assure full penetration of the parts and welding of the entire faying surfaces, and then the power is progressively decreased as the beam traverses to the opposite tip 34. Either the source of the electron beam can be traversed or the parts being welded can be rotated to pass through the locus of an electron beam in a fixed position. In either case traversal is around the axis of the journal pin and is accomplished with simple set-ups.

In electron beam welding the mating surfaces of the parts to be welded are irradiated with a focused beam of electrons which melts the surface and forms a welded interface which can extend deeply between the parts in the direction of beam penetration. Such electron beam welds are characterized by a depth of penetration much larger than the width of the heat affected zone thereby minimizing warping and distortion of the parts. Substantially the entire faying surfaces 33 and 38 can be welded to form a strong weld bead extending through an arc of about 180°.

The resultant semi-cylindrical weld bead 44 is substantially symmetrical about a plane including the axis of rotation 31 of the rock bit and the axis 37 of the journal pin 14. It will be recognized that in actual practice such a plane precisely including the axis of the rock bit and the axis of such a journal pin may not exist since a journal pin axis is sometimes offset by a small fraction of an inch from the axis of the rock bit for enhancing the cutting action of the cone for particular drilling situations. That is, the axis of the journal pin does not intersect the rock bit axis but passes a small fraction of an inch to one side of the rock bit axis. The resultant discrepancy is slight enough that the weld bead can be considered substantially symmetrical about a plane defined by the approximate locii of these axes.

The weld bead 44 is substantially entirely above a second plane including the axis 37 of the journal pin and perpendicular to the first plane including the axis of the rock bit; that is, the weld bead extends in an arc approximately 180° around the journal pin axis. Typically, the weld bead extends slightly less than 180° so that the tips 34 at the edges of the socket on the rock bit leg segment are not unduly thin and do not interfere with insertion of the journal pin insert into the socket. The weld bead is relatively shallow in the end portions adjacent this second plane and relatively deep near its center; that is, deep where the weld bead crosses the plane including the rock bit axis and the journal pin axis.

After the weld is made between the journal pin insert and the rock bit leg segment, a pair of faces 45 are machined on the rock bit leg parallel to the axis 31 of the rock bit being built and lying 120° apart so that three such legs collectively form the body of a rock bit. Such faces are present on the forging and only finish machining to the desired tolerances is needed. When machining the 120° faces on the rock bit leg the centers 39 used for turning the insert can be employed for alignment to assure that the faces 45 are properly positioned and to provide any desired offset or skewing of the journal pin. Alternatively alignment can derive from the nose of the journal pin or from the ball bearing race 19. If desired, the lubricant passage 24 can be reamed or redrilled to remove blow-out and spatter from the welding operation. Such a passsage can be provided in the rock bit leg segment and journal pin insert before welding and the electron beam weld can travel across the open passage to form a weld bead on both sides of the passage. Some blow-out of metal into the passage can occur and it is desirable to remove such material before completing the rock bit. Alternatively such a lubricant passage 24 can be drilled after electron beam welding the journal pin insert and rock bit leg segment.

If desired, hard facing material can be added to the shirttail surface 36 and such surfaces are typically finally machined or ground to the desired dimensions at this stage of assembly. Additional forming of the shirttail surfaces may be included after assembling three rock bit legs to form a rock bit.

After machining, the rock bit leg is heat treated by quenching and tempering to develop the desired mechanical properties of the journal pin. If warpage during heat treating is a problem the 120° faces can be machined after heat treating. A cutter cone is assembled on the journal pin as hereinabove described and the ball plug welded in place. Three such bit leg assemblies are assembled together and the 120° faces 45 on adjacent legs are electron beam or arc welded together to form the rock bit body. After such welding the threads 12 are turned on the pin end of the rock bit.

The semi-cylindrical faying surfaces on the journal pin insert and the rock bit leg segment are desirable since such cylindrical surfaces are easily formed by conventional manufacturing operations. This is particularly true of the faying surface 38 on the insert which is readily made concentric with the journal pin 14. The semi-cylindrical weld is approximately equivalent to a butt weld and has low stress levels as contrasted with relatively high stress levels which can be encountered where the weld bead extends a full 360° around the journal pin. Further, a semi-cylindrical weld bead concentric with the axis 37 of the journal pin permits easy alignment of the electron beam with the faying surfaces by use of the centers 39 used in turning the faying surface 38 and journal pin. Relative motion of the electron beam and rock bit leg along such a cylindrical path is easily accomplished.

Welding the journal pin insert and rock bit leg segment with the electron beam impinging from the inside is desirable since visual inspection of both the inside and outside faces is facilitated. If the electron beam impinged from the outside and penetrated toward the flange 42, visual inspection at the inside of the rock bit leg would be infeasible since it is undesirable to burn through the flange from the outside and the flange would obscure the root of the weld. Further, upon machining the shirttail face any weld defects on the outside surface can readily be exposed and repaired. The meltdown of the flange on the inside surface helps avoid defects along this edge of the weld.

The semi-cylindrical faying surfaces coaxial with the journal pin alleviate need for careful orientation of the insert. Thus, even if the insert is rotated slightly about the journal pin axis, the faying surfaces remain in intimate contact and there is no shifting of the location of the journal pin with respect to the balance of the leg. The flange 42 serves as a stop which determines the position of the journal pin with respect to the leg segment in a direction along the axis of the journal pin. The semi-cylindrical faying surfaces for welding avoid any significant tooling problems. The slightly larger size of the journal pin insert relative to the socket avoids need for special holding tools.

Although described in detail with respect to an exemplary embodiment, many modifications and variations will be apparent to one skilled in the art. Thus, for example, the rotary rock bit hereinabove described and illustrated has a sealed bearing for each cutter cone with pressurized lubricant supplied to the bearing. If desired passages can be provided through the bit body for conducting air from the hollow interior of the bit body to the bearing races for an air operated rock bit. Such an air cooled bit typically has roller bearings instead of the journal bearings 22 hereinabove described and the bearings are open instead of sealed. Air flow keeps rock chips out of the bearings. Air flow also conveys rock chips out of the drill hole through the annulus between the drill string and the hole wall. It will also be apparent that principles of this invention are applicable to two or four cone rock bits, as well as the exemplary three cone rock bit. Many other modifications and variations will be apparent to those skilled in this art and the spirit and scope of the appended claims should not necessarily be limited to the description of the preferred versions contained herein.

What is claimed is:

1. A method of making a rotary rock bit comprising the steps of:
    forming a rock bit leg segment having an upper shank end and a lower end, the lower end including a socket having a semi-cylindrical faying surface transverse to the axis of the rock bit being formed;
    forming a journal pin insert including a journal pin for mounting a rock bit cutter cone, a shirttail transverse to the journal pin, and a semi-cylindrical faying surface on the shirttail portion coaxial with the journal pin;
    fitting the journal pin insert to the rock bit leg segment with the semi-cylindrical faying surface of the journal pin insert mated with the semi-cylindrical faying surface of the socket; and
    electron beam welding the semi-cylindrical faying surfaces.

2. A method as recited in claim 1 wherein the faying surfaces are welded in an arc of about 180° coaxial with the journal pin and substantially symmetrical about a plane including the axis of the journal pin and the axis of the rock bit being formed.

3. A method of making a rock bit as recited in claim 1 wherein the radius of the semi-cylindrical faying surface on the journal pin insert is slightly larger than the semi-cylindrical faying surface on the rock bit leg segment for temporarily holding the journal pin insert on the rock bit leg segment before welding.

4. A method of making a rock bit as recited in claim 3 further comprising:
    forming a flange adjacent the inner edge of the semi-cylindrical faying surface on the journal pin insert; and
    fitting the journal pin insert to the rock bit leg segment with the flange against an inside surface on the rock bit leg segment adjacent the semi-cylindrical faying surface of the socket.

5. A method of making a rock bit as recited in claim 4 further comprising directing an electron beam from the journal pin side of the journal pin insert for penetrating the flange and welding the faying surfaces.

6. A method of making a rock bit as recited in claim 1 further comprising adjusting the electron beam power for forming a relatively deeper center portion of the weld bead adjacent a first plane including the axis of the rock bit being formed and the axis of the journal pin and a relatively shallower end portion of weld bead adjacent a second plane perpendicular to the first plane and including the axis of the journal pin.

7. A method of making a rock bit as recited in claim 1 further comprising:
    forming a flange adjacent the inner edge of the semi-cylindrical faying surface on the journal pin insert; and
    fitting the journal pin insert to the rock bit leg segment with the flange against an inside surface on the rock bit leg segment adjacent the semi-cylindrical faying surface of the socket; and
    directing an electron beam from the journal pin side of the journal pin insert for penetrating the flange and welding the faying surfaces.

8. A method of making a rotary rock bit comprising the steps of:
    forming a rock bit leg segment having a socket at one end including a female semi-cylindrical faying surface;
    forming a journal pin insert including a journal pin for mounting a rock bit cutter cone and a male semi-cylindrical faying surface coaxial with the journal pin, each of such faying surfaces being a generally wedge-shaped segment extending about 180° around a cylinder;
    mating the faying surface on the journal pin insert to the faying surface on the rock bit leg segment; and
    electron beam welding the semi-cylindrical faying surfaces.

9. A method of making a rock bit as recited in claim 8 where the male faying surface on the journal pin insert is slightly larger than the female faying surface on the rock bit leg segment for temporarily holding the journal pin insert in place.

10. A method of making a rock bit as recited in claim 8 further comprising forming a flange on the journal pin insert adjacent one edge of its semi-cylindrical faying surface and directing an electron beam into metal adjacent the faying surfaces from a direction corresponding to the inside of the rock bit being made for melting at least a portion of the flange during electron beam welding.

* * * * *